(No Model.)

O. REZNICK.
LUGGAGE CARRIER.

No. 585,833. Patented July 6, 1897.

WITNESSES
P. F. Nagle.
L. Douville.

INVENTOR
Oscar Reznick,
BY John A. Wiedersheim
ATTORNEY

THE NORRIS PETERS CO., PHOTO-LITHO., WASHINGTON, D. C.

UNITED STATES PATENT OFFICE.

OSCAR REZNICK, OF PHILADELPHIA, PENNSYLVANIA.

LUGGAGE-CARRIER.

SPECIFICATION forming part of Letters Patent No. 585,833, dated July 6, 1897.

Application filed February 3, 1897. Serial No. 621,753. (No model.)

*To all whom it may concern:*

Be it known that I, OSCAR REZNICK, a citizen of the United States, residing in the city and county of Philadelphia, State of Pennsylvania, have invented a new and useful Improvement in Luggage-Carriers, which improvement is fully set forth in the following specification and accompanying drawings.

My invention consists of a novel construction of luggage-carrier which is especially adapted for bicycles and is designed to be carried on the front portion of the frame or fork of a bicycle in advance of the rider, means being provided whereby the front of the carrier is adapted to serve as a receptacle, the contents of which are readily accessible when the carrier is opened, the carrier being also provided with means for setting it on the fork or frame of a bicycle and means for securing it thereto.

It further consists of novel details of construction, all as will be hereinafter fully set forth, and specifically pointed out in the claims.

Figure 1:
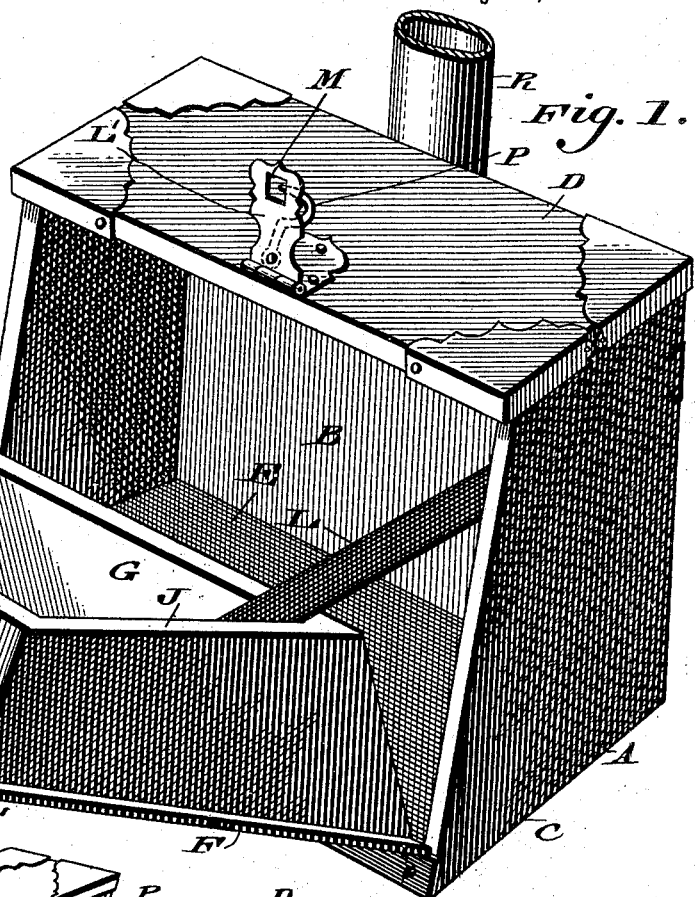
Figure 4:
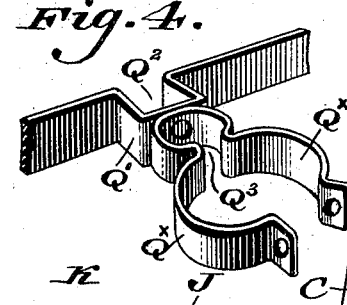
Figure 2:
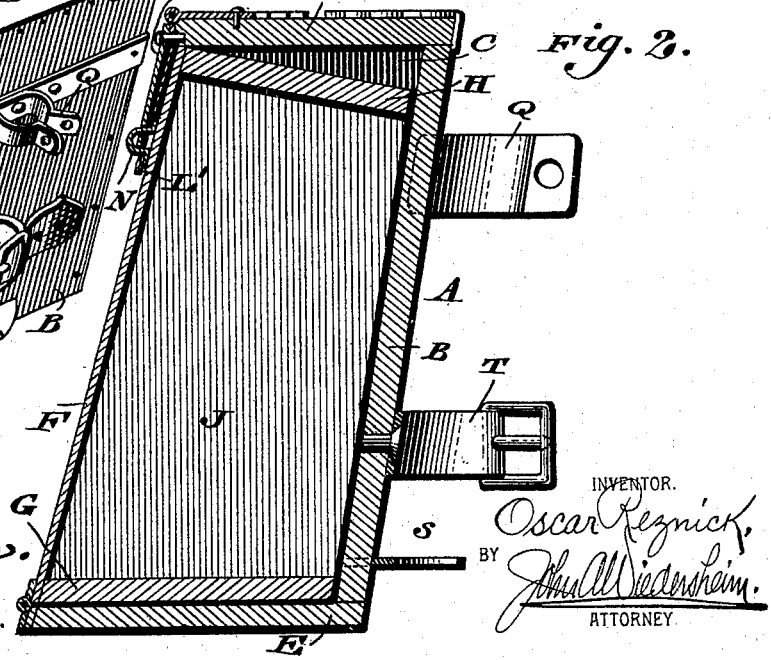
Figure 3:
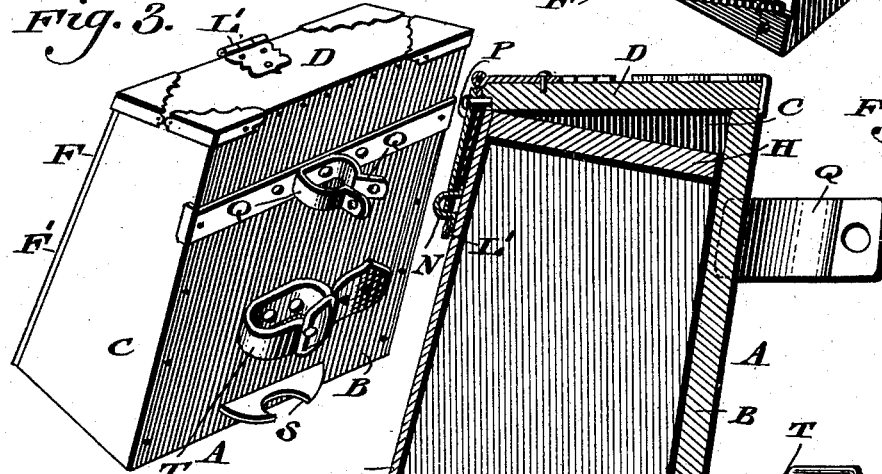

Figure 1 represents a perspective view of a luggage-carrier embodying my invention, the same being shown in open position, and a portion of the front fork of a bicycle to which the same is applicable. Fig. 2 represents a sectional view through the luggage-carrier, the same being shown in closed position. Fig. 3 represents, on a reduced scale, a perspective view of the rear of the carrier, showing especially the means for attaching the latter to a bicycle. Fig. 4 represents a modification of the clip.

Similar letters of reference indicate corresponding parts in the several figures.

Referring to the drawings, A designates the body of a luggage-carrier, the same consisting of the back B, sides C, top D, and the bottom or base E, it being noted that the back B stands normally in an inclined position and forms an acute angle with the top D and an obtuse angle with the base E, the carrier being in the present instance wider at its base than at its top.

F designates the front wall of the carrier, which is hinged to the base E, said wall having attached to the lower portion thereof the base G and to its upper portion the top H, it being noted that said top is attached to the front wall at substantially a right angle, so as to enable the carrier to be readily opened, while the base G is attached to the front wall F at substantially an acute angle, it being also noted that the ends F' of said front wall are adapted to overlap the edges of the sides C.

J designates sides which extend between the top and base H and G, respectively, whereby a tray or receptacle K is formed which is readily accessible when the carrier is opened, as indicated in Fig. 1, the proper position of said receptacle K being assured by means of the connection L common thereto and to the body of the carrier.

L' designates a latch which is attached to the top D of the carrier and is provided with an opening M therein, through which opening when the carrier is closed passes a staple or eye N, attached to the front wall F, said staple being engaged by the hook P, as indicated in Fig. 2, when it is desired to hold the parts in locked position.

Q designates clips, which are secured to the rear wall B of the carrier in any suitable manner and are adapted to engage the frame R of the bicycle, the position of the lower portion of the carrier relative thereto being assured by means of the socket S, after which the strap T is employed for positively holding the carrier in the desired position.

The operation is as follows: The carrier is attached to the front fork or frame of the bicycle by means of the clips Q and the strap T, so that it is preferably in advance of the rider. When the rider desires to obtain access thereto, it is only necessary to manipulate the hook P, whereupon the front F can readily descend into the position indicated in Fig. 1, and by reason of the peculiar construction of the body of the carrier and the manner of attaching the top, base, and side walls to the front wall F, so as to form the tray or receptacle K, all the contents of the carrier are readily accessible.

In Fig. 4 I have shown a modified construction of clip for attaching the carrier to a bicycle-fork. The clip Q, as shown in Figs. 2 and 3, is attached directly to a suitable crosspiece, but in Fig. 4 the cross-piece is provided with an offset Q', whereby a recess $Q^2$ is formed for the reception of a nut or projection which exists on some makes of bicycles.

The clips $Q^\times$, as seen in Fig. 4, are attached to the offsets $Q'$ and are constructed so that a recess or passage-way $Q^3$ is formed, through which the brake-rod of the bicycle is enabled to pass, it being of course understood that the clips Q and $Q^\times$ in each instance are provided with openings therein, through which a suitable bolt and nut or other fastening device passes, whereby the carrier is firmly secured in position.

It will of course be evident that various changes may be made by those skilled in the art which will come within the scope of my invention, and I do not therefore desire to be limited to the exact construction I have herein shown and described.

Having thus described my invention, what I claim as new, and desire to secure by Letters Patent, is—

1. A luggage-carrier consisting of a box, a tray hinged thereto, a cross-piece secured on the rear wall of said box and provided with an offset, a spring-clip secured to said offset, a tightening-strap secured to said rear wall below said clip, and a socket-piece projecting from said wall in line with said clip and strap.

2. A luggage-carrier, a box with a tray hinged to the outer end of its base and adapted to be closed within the said box, overhanging flanges upon the sides of the tray and the top of the box, and attaching means consisting of a spring-clip, a strap, and a socket, each being connected with the rear wall of said box in line one with the other and in the order described.

3. A luggage-carrier, having attached to a suitable portion thereof a cross-piece, said cross-piece being provided with an offset, and a clip or similar fastening device secured to said offset, a recess being formed by the members of said clip for the passage of a brake-rod, and the outer portions of said clip being adapted to engage a bicycle-fork, and to be clamped in position thereupon.

OSCAR REZNICK.

Witnesses:
E. H. FAIRBANKS,
WM. C. WIEDERSHEIM.